Feb. 12, 1952

G. L. WEISSMAN ET AL 2,585,882

DANGER DETECTING MEANS FOR
GAS DISTRIBUTING SYSTEMS

Filed Oct. 12, 1945

2 SHEETS—SHEET 1

INVENTORS

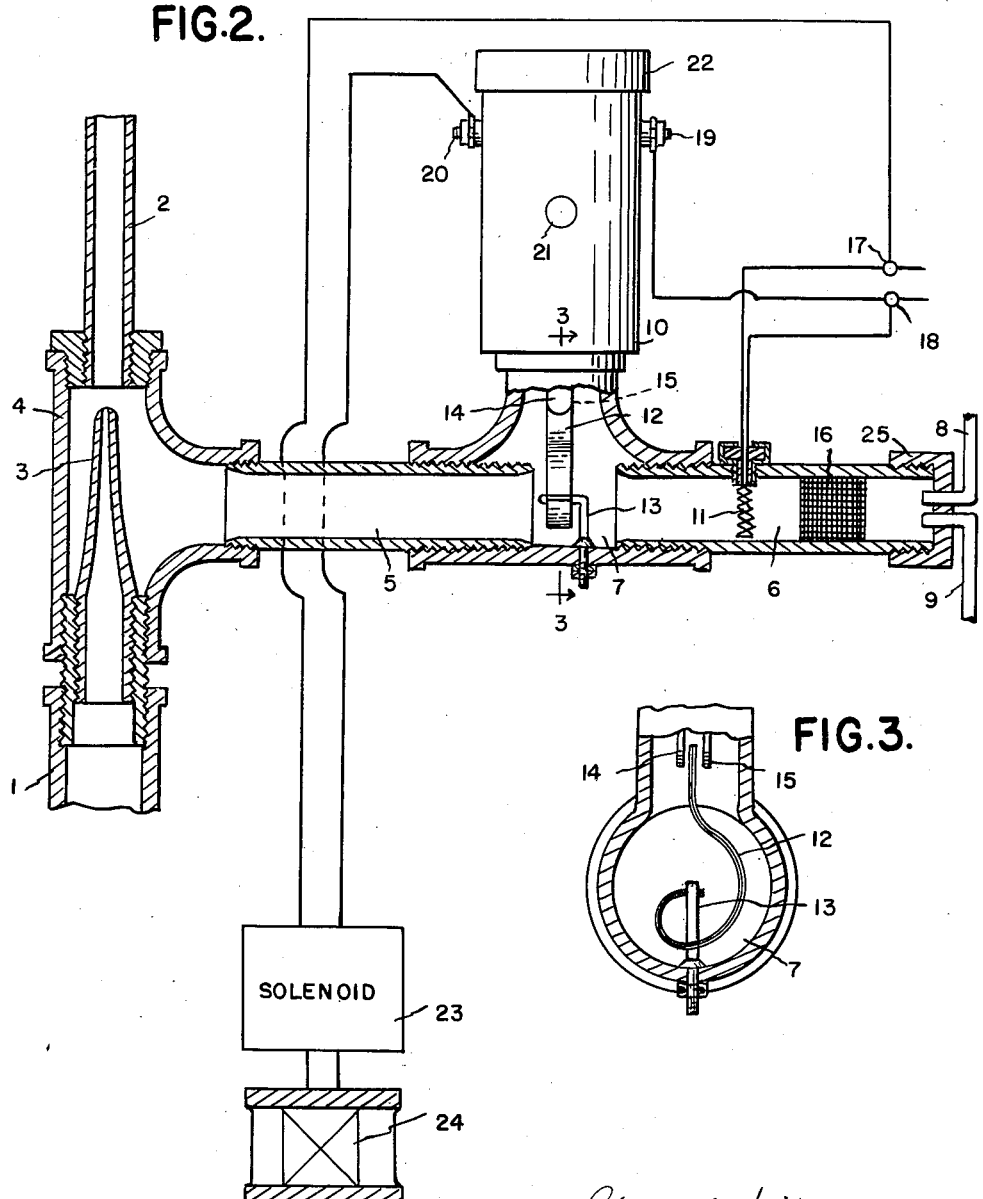

Patented Feb. 12, 1952

2,585,882

UNITED STATES PATENT OFFICE 2,585,882

DANGER DETECTING MEANS FOR GAS DISTRIBUTING SYSTEMS

George L. Weissman and Howard A. Graffis, Detroit, Mich.; said Graffis assignor to said Weissman Application October 12, 1945, Serial No. 621,924

6 Claims. (Cl. 158—123)

The invention relates to apparatus for use in connection with gas distributing systems and it is the primary object of the invention to detect danger or possible danger in the operation.

It is a further object to provide detecting means for the presence of an inflammable mixture of air and gas in a selected area, also for detecting failure of gas pressure in the supply system which might result in the extinguishing of a gas burner with the subsequent escape of gas therefrom.

Still further it is an object to detect any inoperative condition in the detecting apparatus which would cause failure in operation thereof.

It is a further object to utilize the detection means either for warning of possible danger or for the actual cutting off of the gas supply thereby eliminating the danger.

The above and other objects are realized in accordance with the present invention by passing a current of gas taken from the atmosphere of a selected space which may be suspected of containing a dangerous explosive, or near explosive mixture of gases, through a flash-back arrester into and through an ignition chamber enclosed away from the selected space, first passing the current of gas within said chamber into contact with and past a normally functioning source of heat within said chamber whereby the gases of said current are normally brought to a temperature at least great enough to ignite any ignitable mixture contained therein and cause it to burn, and then carrying the resulting current of normally heated gases into contact with and past temperature responsive means attached to said chamber whereby a source of power for a warning device or, preferably, a source of power for a gas flow controlling device operatively connected to the main supply line of a combustible gas, is put into operation in response to predetermined changes, increases or decreases, in the temperature of said normally heated gases. The method is especially valuable because it not only functions to positively eliminate danger before an explosive mixture develops or as soon as such a mixture is present, but also gives warning or automatically shuts off a combustible gas supply whenever the heat source used in the method fails.

The novel means and apparatus combinations described herein are especially suitable for use in the above mentioned new method of warning or of control of a combustible gas supply.

The invention will be understood by reference to the accompanying drawings and the description of the same and their functions given below.

Figure 1:
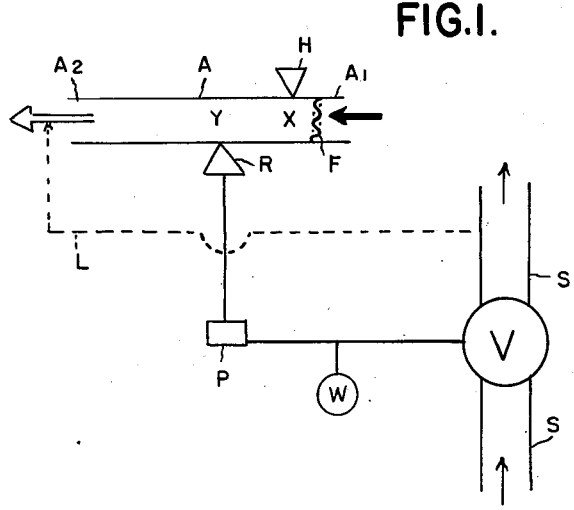
Figure 4:
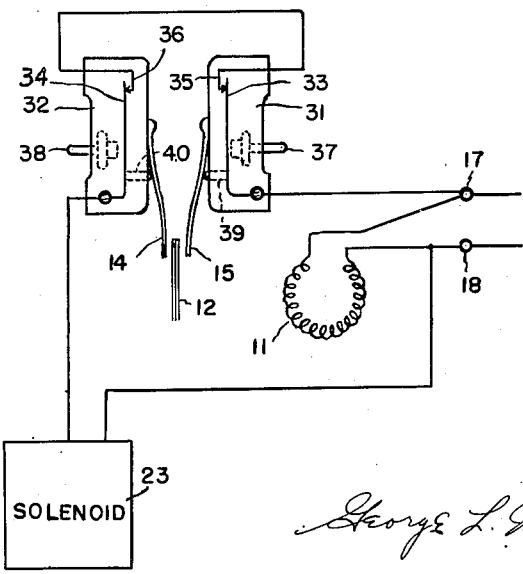

Fig. 1 of the drawings is a functional diagram wherein the symbols represent general means and their functions, rather than any particular form of apparatus, thereby clarifying the complete new warning and flow controlling process and the interrelationships of the various steps therein; Fig. 2 an elevation, showing a preferred embodiment of apparatus for carrying out the flow controlling process, which is largely in cross-section but having limited portions of the figure around the centrally located thermoresponsive part appearing in full open view; Fig. 3 an enlarged detail in cross-section of the bi-metallic thermoresponsive element and switch members cooperating therewith taken along line 3—3 of Fig. 2; and Fig. 4 is a wiring diagram showing the electrical connections used with the apparatus of Fig. 2 and is particularly useful because it shows the internal wiring of the switch box of Fig. 2 and also serves to illustrate the mode of operation of the two normally closed, single pole, single throw, maintained-contact type micro switches equipped with manual reset pins which are contained in the switch box of Fig. 2.

In the functional diagram of Fig. 1 there are shown a main supply line S for combustible gas, a warning device W and/or a controlling means V for giving a warning signal or actually controlling the supply of said gas, and inserted in line S if a controlling means but either entirely separate from line S or connected therewith, as desired, if a warning device W means, a chamber A having an inlet $A_1$ for the gas at one end thereof and an outlet $A_2$ spaced a convenient distance from inlet $A_1$ to form an ignition chamber within chamber A large enough to accommodate a flashback arrester F a heat supplying region X and a heat transfer space Y on the opposite side of region X from arrester F, a heat source H opposite region X for heating the same and also igniting combustible gas mixtures flowing through chamber A, a means R located opposite space Y and responsive to temperature changes therein so as to actuate a source of power and danger detecting device P which is operatively connected to means R and actuates the same to automatically produce movement or proper functioning of warning and/or controlling means V corresponding to said temperature changes.

The arrows at inlet $A_1$ and outlet $A_2$ indicate direction of gas flow caused by pressure at the right of the arrows or suction at the left and ahead of the arrows, or by combination of the pressure and suction. Means for producing the pressure and/or suction with consequent flow of gas through A may consist of any of the conventional or known means for so operating. However, in the preferred method, the gas flow producing means for chamber A is operative by virtue of normally continuous pressure in line S on the delivery side of a valve V inserted in S which is transmitted to and serves to operate said gas flow producing means. This is indicated by dotted line L of Fig. 1, but is more clearly illustrated by the embodiment of the invention as shown in Fig. 2 where a venturi or jet located back of a pilot is connected to the main gas supply line on the delivery side of the main gas supply line valve and is used to produce suction and hence flow of gas through the ignition chamber and past the heated wire filament.

At least a general idea of the operation of the method of the present invention can be understood by reference to Fig. 1. Thus, when there are no leaks in the gas supply system of which the main supply line S is shown, and when there is adequate combustion of gas at delivery points of the system and no gases or flammable vapors from any source whatsoever are being released andd drawn into chamber A, the flow through chamber A consists mainly of ordinary air, with perhaps a small percentage of burned gases in those instances where gas from supply line S is being burned outside of chamber A for normal heating or power purposes. Under such normal circumstances, there is a constant supply of heat by source H and also a constant and continuous transfer of heat from region X to space Y with no appreciable temperature fluctuations in space Y, since the flow of air through A is also substantially constant. Now any one or all of several dangerous circumstances can arise but the method diagrammed in Fig. 1 will promptly and automatically operate to remove the danger of fire and explosion by completely shutting off the supply of gas in line S.

If there is a failure of heat supply means H there will be a decrease in temperature in space Y which will cause temperature responsive means R to actuate device P to shut off the supply at controlling means V.

If a leak occurs in the vicinity of chamber A, the combustible gas and air mixture formed will be forced through chamber A and ignited by the high temperature in heat supplying region X, the additional heat of the resulting combustion causing a temperature increase in space Y which likewise automatically causes temperature responsive means R to actuate device P to shut off the gas supply at controlling means V. Conduits or pipes can be used to conduct gases or flammable vapors from distant points up to chamber A, so that the method operates as a result of the presence of dangerous mixtures of air or like oxidizing gas with combustible gas or flammable vapors at places located remote from chamber A and even when combustible gases or vapors of different chemical composition from that in line S are present or when they are derived from sources not connected in any way with the gases in supply line S.

In the preferred method where gases are caused to flow through the ignition chamber by virtue of normally continuous gas pressure on the delivery side of the main supply valve or regulator, such as where a Venturi-backed pilot burner is burning and is connected with line S on the delivery side of controlling means V, as indicated by dotted line L, the method is especially efficient because the pilot burner (a potential means for igniting explosive mixtures) not only goes out when the main gas supply is shut off at controller V, but controller V itself is automatically made to shut off the supply whenever the pilot burner is blown out or otherwise extinguished while controller V is still open or in the "on" position. This latter action occurs because the unburned gases escaping at the extinguished pilot burner are carried into and burned in chamber A and then drawn past space Y, thereby producing the necessary temperature increase in space Y to cause the main supply to be shut off. This action can be made to occur more quickly and more certainly by having inlet $A_1$ of A near the pilot burner or directly connected by a pipe to a point very near to the pilot burner.

Actual operation of the method and especially the preferred method, as well as new and novel apparatus useful for carrying out the preferred method, can be even better understood by reference to Fig. 2 with reference to Figs. 3 and 4 where necessary.

Fig. 2 shows a pipe 1, which supplies combustible gas, taken from the delivery side of the main gas supply line valve 24, to a jet 3 which supplies gas through pipe 2 to a conventional pilot light, not shown. Flow of the gas through the jet 3 located in T-connection 4 produces suction in the ignition or combustion chamber consisting of fire-resistant nipples 5 and 6 and T-connection 7, tnereby sucking gases into said chamber through tubes 8 and 9 fitted into the cap 25 that is fastened onto the outer end of nipple 6 in an airtight manner.

Tube 8 can be of short length because pipe 2 is customarily short for a pilot burner and the flame of the pilot burner at its upper end is therefore fairly near to cap 25. However, it is preferred that the end of tube 8 extend to a point very near to the pilot flame and not more than an inch or two away from the flame, so that the entire apparatus will function quickly in case the pilot flame is accidentally blown out. Only one tube, such as tube 8, carrying atmosphere from the space in the immediate vicinity of the pilot flame is necessary for operation of the method when using the apparatus of Fig. 2. Nevertheless, tube 9 is also shown, since a plurality of tubes leading from different selected spaces other than that near the pilot flame can also be present. For example, tube 9 can lead from a point near a main burner for gas derived from the main supply line. Since the volume of gas flowing through a main burner is ordinarily much greater than that flowing through the pilot, the preferred and safest apparatus is that having tubes passing through cap 25 that not only carry atmosphere from near the pilot flame but from all other points where combustible gas is being delivered which could be ignited by the pilot flame or like source of heat.

It is of course to be understood that instead of having separate tubes leading to the ignition chamber from each selected space intended to influence operation of the shut-off method during periods of danger, one can provide a minimum of only one tube, such as tube 8, which is branched in any desired manner to bring atmosphere from the vicinity of one or more pilot flames and also at the same time from one or more burners. The single delivery tube, such as 8, can also have a branch or some of its branches extending to the open air of rooms or other spaces not located close to a regular delivery point for the combustible gas.

An airtight switch box 10 is shown in Fig. 2 and is screwed into the T-connection 7 in an airtight manner. Inside of switch box 10 there are two spring leaf actuated snap action switches, not shown in Fig. 2 but represented diagrammatically in the wiring diagram of Fig. 4. The switches have manual reset buttons which are operated in airtight manner through the walls of switch box 10 by means of front screw 21, shown in Fig. 2, and a like back screw, not shown, located on the other side of switch box 10 from screw 21. Terminals for the two switches, which are connected electrically in series, are shown at 19 and 20. Cap 22 is screwed onto switch box 10 after the switches are installed and this serves to make said switch box substantially airtight.

Electrical heating resistor 11 connected to a source of electrical power at points 17 and 18 supplies heat which is transmitted at least in part to bimetallic thermoresponsive element 12 which is normally kept at a more or less uniform temperature causing its free movable end to hold a substantially constant normal position midway between the tips 14 and 15 of the spring leaf actuators of the two snap action switches. Bimetallic element 12 is rigidly mounted or fixed in the streamlined support 13 attached to T-connection 7. Although thermoresponsive element 12 is referred to as being "bimetallic," this term is intended to include any equivalent element made up of strips of closely adhering metals having differing coefficients of expansion whether two or more metals or two or more strips are used.

16 is a tightly wound coil of wire gauze wedged into nipple 6 and serving as a flash-back arrester.

Solenoid 23 is connected electrically in series with the snap action switches in switch box 10 and this circuit is in parallel with the heating resistor circuit as is more evident from Fig. 4. Part 23 of Fig. 2 is intended to represent not only an electrically operated solenoid but also the additional parts of an electromagnetically held valve operator equipped with manual reset and located external to, but in operative connection with, the main gas supply valve 24. Such an operator and valve combination as represented by 23 and 24 of Fig. 2 is described as an MR-1-2 manual reset valve on page 34 of Catalog No. 51 (Fall 1941) of General Controls Co.

In Fig. 4 there is shown the wiring diagram used with the apparatus of Fig. 2. The current supplied at terminals 17 and 18 is 24 volt 60 cycle alternating current which can for example be brought down by a step-down transformer from the ordinary 110 volt 60 cycle current used for household purposes. Parts 11, 12, 14, 15 and 23 of Fig. 4 represent the heating resistor, bimetallic thermoresponsive element, two spring leaf actuator tips and solenoid respectively of Fig. 2. The two snap action switches 31 and 32 are of the normally closed, single pole, single throw, maintained-contact type micro switches equipped with plunger pins 39 and 40 and manual reset pins 37 and 38 respectively. A switch of this type is described on page 1.07 of Micro Precision Snap Action Switches Catalog No. 60 (1941) of the Micro Switch Corporation, Freeport, Illinois, as well as on other pages of this catalog and in United States Patent No. 1,960,020.

Fig. 4 illustrates the normally closed micro switch-solenoid series circuit in parallel with the electrical heating resistor (11) circuit. When temperature changes cause the free end of bimetallic element 12 to press against tip 14 or 15, plunger 39 or 40 is depressed and causes snap action breakage of electrical contact between contact points 34 and 35 or between contact points 34 and 36. Regardless of which contact is broken, or if both are broken, the series circuit is thereby broken and current ceases to flow through the solenoid. This failure of current to flow causes the valve operator 23 to close valve 24 of Fig. 2. When contact between points 33 and 35 or points 34 and 36 is broken, it stays broken until contact is made again manually by means of reset pins 37 or 38 or both, as will be required to complete the circuit. The remade contact will, however, immediately be broken unless the thermoresponsive element 12 is kept between tips 14 and 15 and is not exerting pressure on either tip. So also when the valve operator 23 closes valve 24, the latter will stay closed until the operator is manually reset in the open or "on" position again.

*Cycle of operations*

A complete cycle, from the setting of the apparatus into operation, through the final shut-off stage and up to the point where the apparatus is again ready for operation, will now be described with reference to Fig. 2, 3 and 4.

Assuming that main gas supply line valve 24 is open and maintained in that position in consequence of current flowing continuously through the solenoid of valve operator 23, the jet 3 and a main burner, not shown but located near the outer open end of tube 9, will then be supplied with combustible gas, such as the artificial or natural gas ordinarily used for household or commercial heating or power purposes. The heating resistor circuit is always closed and 6 volt, 60 cycle electric energy is supplied at terminals 17 and 18 (e. g. by an ordinary 4 watt bell-ringing transformer) to keep the B. & S. 29-gauge Chromel-A (80 nickel, 20 chromium alloy) wire (Nichrome wire) at a temperature of about 600° C. or higher. This requires about 0.7 ampere of current for a 20 turn coil with ⅛ inch in diameter turns and about an 8 inch straight wire length.

The plunger of the solenoid of 23 acts merely as a keeper of a mechanism that releases strong springs inside of valve operator 23 and these close valve 24 when the current fails and allows the plunger to trip a spring release mechanism. The solenoid current is therefore negligible and only 0.005 watt is needed for it. After the valve operator and valve combination has thus closed valve 24, the combination and the springs inside of operator 23 are made ready for automatic operation again by manual re-setting, e. g. as described above for the MR-1-2 manual reset valve.

Due to gas pressure in pipe 1 located on the delivery side of valve 24, there is flow of gas through the very fine orifice of jet 3 and to the pilot flame by way of pipe 2 and an ordinary pilot burner located at the upper end of pipe 2. Flow of gas through jet 3 produces suction or ejector action and flow of gas from a point near the pilot flame where the open end of tube 8 is located and from a point near the main burner flame where the open end of tube 9 is located to and through the ignition chamber (5, 6 and 7) and up to the jet. Such flow therefore continuously carries atmosphere from the immediate vicinities of the pilot burner and at least one main burner past the flash-back arrester 16, the electrically heated resistor 11 and over the bimetallic strip or coil 12 where the latter is ordinarily heated to a temperature of about 200° F. by convection heating due to the flow over the coil 12 of the gases which have been heated by their contact with the hot resistor. When the bimetallic strip is installed, it is located so that the tip of its free end will, at 200° F., be midway between tips 14 and 15 of the spring leaf actuators of the two snap action switches, as shown in Fig. 3.

If no leakage of gas is occurring and the pilot burner and main burner are turned on and burning properly so that gas is being consumed without any losses, the suction pulls a mixture of air and burned gases through tubes 8 and 9 into the ignition chamber where they are heated at the surface of the resistor 11 to about 600° to 800° C. and then passed over element 12 to give the latter a substantially constant temperature of about 200° F. The exact temperature at element 12 will depend mainly upon the temperature and area of the heating resistor, its distance from element 12, and the rate of flow of gases through the ignition chamber. However, the exact combination of these three factors for a given temperature at element 12 can readily be determined by a simple experiment as described below under the heading, "Determining Thermoresponsive Element Temperature."

Assuming that the normal non-leak condition temperature at 12 is 200° F. and that an increase or decrease of 15° F. or more will snap the switches, that the main supply valve is in the "on" position and that pilots and all other burners are functioning properly and none of the selected spaces are supplying any combustible gas to the ignition chamber, then the series circuit which includes the solenoid is maintained continuously so that there is no movement of main supply valve 24 and the latter remains in the "on" position.

Again assuming that the apparatus of Fig. 2 is surrounded by ordinary air and that a leak develops or combustible gas or vapor is otherwise released at a point near enough to the open end of tubes 8 or 9 or one of their various branches to be carried into the ignition chamber along with air, then the Nichrome coil 11 will ignite the combustible gas or vapor and the temperature of bimetal strip 12 will begin to increase. If the different parts of the apparatus have been properly located and selected as described above, then the free end of strip 12 will begin to move toward one or the other of the tips 14 and 15 but will not snap the corresponding switch until an increase of at least 15° F. above 200° F. (i. e. 215° F.) has taken place at strip 12. Such an increase of 15° F. can, as already explained, be made to occur when the proportion of combustible gas or vapor relative to air or like oxidizing gas has reached a value a safe distance below the minimum explosive limit for that particular combination of gases. At 215° F. one of the two switches, 31 and 32, is snapped and the solenoid circuit broken so that the valve operator immediately and automatically closes main supply valve 24. Thus, the main supply of combustible gas is shut off before a truly explosive mixture has time to develop. If, on the other hand, a sudden supply of an explosive mixture is drawn into the ignition chamber, the mixture will burn and function in the same way to shut off the main supply and there will be no danger of an explosion because of the presence of flash-back arrester 16 which prevents the combustion spreading from the ignition chamber back into the selected space containing the mixture.

After the valve operator 23 causes valve 24 to automatically shut off the main gas supply, the jet 3 ceases to operate and there is no suction or flow of gases through the ignition chamber. For this reason, there is little conduction of heat from heating resistor 11 to strip 12 and the later drops in temperature, in spite of the heating element 11 being at an ignition temperature of about 600° or 700° C. The drop in temperature at strip 12 causes it to snap the other switch which is on the "cold" side. Hence, when the leak is repaired or no more mixtures of combustible gas or vapor with oxidizing gas are present and one is ready to put the apparatus into operation again, it is necessary to first turn front screw 21 and its corresponding back screw on box 10 so as to depress reset pins 37 and 38 and then manually reset operator 23 so that valve 24 is again brought to the "on" position. As soon as gas begins to flow through jet 3, the suction is again set up in ignition chamber 5, 6 and 7 and strip 12 is again quickly heated to its normal temperature of 200° F. and assumes a position with its free end midway between switch actuator tips 14 and 15. At this point the screws are backed off of reset pins 37 and 38 and the cycle is completed and the apparatus again in normal operation.

The above cycle relates to conditions where mixtures of combustible gases with gases supporting their combustion are present. In those cases where the current supplying heat to resistor 11 fluctuates greatly or fails completely the same cycle of operations occurs, but in every case where a temperature decrease takes place first, the switch on the "cold" side is the only one to be snapped. Nevertheless, for convenience and for safety's sake, both reset pins 37 and 38 are depressed and then released when putting the apparatus back into operation. If the current at terminals 17 and 18 gets too low or fails entirely, the solenoid and valve operator come into play and close the valve before the snap action switch has time to break the circuit. Yet when the main supply valve is thus shut off primarily by failure of the solenoid current, the resultant cooling effect at 12 causes the switch on the "cold" side to soon snap and break the circuit, thereby making it necessary to go through the same cycle of operations as already described in order to put the apparatus back into operation.

If jet 3 becomes stopped up or there is a dangerous drop in pressure in the system supplying the combustible gas, the suction through the ignition tube or chamber is greatly weakened or destroyed and this causes a cooling effect at strip 12 which results, as in other similar instances already described, in the main supply being shut off at valve 24. This constitutes another important safety factor present when using the apparatus of Fig. 2.

From the description herein of the method and apparatus of the invention it will be apparent that the invention is of great importance because it is thereby possible to automatically and quickly shut off the main gas supply when any of a large number of unsafe circumstances arise, not only outside of the apparatus but also within the apparatus itself.

*Determining thermoresponsive element temperature*

With reference to Figs. 2, 3 and 4, the switch box 10 is unscrewed and removed a short distance away from T-connection 7 without depressing the switch actuators and breaking the solenoid circuit. To insure maintenance of the solenoid circuit, it is advisable to screw front screw 21 and its corresponding back screw into switch box 10 before removing the latter from T-connection 7 in order that reset pins 37 and 38 are kept depressed. After the switch box is removed, it is replaced by a rubber stopper carrying a thermometer in such position that when the stopper is fitted snugly and in airtight manner into the top of T-connection 7 the bulb of the mercury thermometer is located alongside of element 12. The rubber stopper must fit tightly in order to maintain the suction in the ignition chamber.

The temperature at strip 12 is first read off of the thermometer while ordinary air is being delivered to the ignition chamber and passed over filament 11 heated to about 600° or 700° C. The ordinary air is then replaced by a known mixture of the gas from the main supply and air which contains a proportion of combustible gas somewhat below the minimum known to constitute a so-called explosive mixture. The exact proportion of gas is chosen so as to provide a factor of safety. That is to say, a mixture is used which contains the lowest proportion of combustible gas at which one desires the apparatus to function so as to shut off the main supply of gas when such mixture is drawn into the ignition chamber during normal operation. While such known test mixture is being drawn over heating resistor 11, an extra amount of heat is generated by combustion of the mixture and when the resulting heated gases pass the thermometer bulb they will register a temperature at strip 12 higher than that when ordinary air is passing through the ignition chamber. Such increase in temperature should be noted and also the increase in temperature when the optimum proportion of the combustible gas with air for complete combustion of the mixture is used in place of the known test mixture first mentioned above.

Knowing the normal operating temperature for strip 12, the temperature when mixtures of the gas with air in proportions safely below the minimum explosive limit are present, and the temperature of strip 12 when proportions are used most favorable to explosion and complete combustion, one is able to choose an element 12 of the necessary construction and strength and locate it so as to keep its free end midway between the switch actuator points 14 and 15 when the apparatus is in operation and there are no gas leaks, yet which will immediately shut off the main gas supply when any proportion of gas with air, at or above the safe limit mentioned above chosen so as to be less than the minimum explosive limit, are drawn into and through the ignition chamber.

For example, electrical heating resistor 11 can be an 8 inch length of Brown and Sharpe 29-gauge Chromel-A wire wound to give 22 turns, each turn being 1/8 inch in diameter, and with an overall coil length of 3/4 inch bent into the form of a single loop inside of, but not quite touching, the walls of a one-half inch inside diameter ignition chamber and lying in a plane which is perpendicular to the gas flow and located about 1 1/8 inches from element 12. If tubes 8 and 9 are bringing in air only and have inside diameters of about 1/4 inch, pipe 1 an inside diameter of 1/2 inch, and pipe 2 an inside diameter of 1/4 inch, jet 3 being an ordinary jet producing a suction in the ignition chamber of about 0.2 inch of water and with city artificial illuminating and heating gas being supplied at about 4 to 8 ounces pressure at the main supply valve 24, then such an arrangement of filament and bimetallic element will give element 12 a temperature somewhere near to 200° F. In any instance, element 12 can be selected and located in the ignition tube so that its free end will snap the two switches open over a wide range of increases and decreases in temperature. Thus, if the temperature of element 12 under normal non-dangerous conditions is 200° F., the element's construction and the distance of its free end from the actuator tips 14 and 15 can be chosen so that a decrease or increase of temperature at element 12 anywhere within the range of 5° F. to 25° F. on either side of 200° F. (preferably about 15° F. on either side) will cause the main supply valve to be shut off. The normal steady non-dangerous condition temperature at element 12 can also be made to vary over a wide range but ordinarily will lie within a minimum of about 150° F. and a maximum of about 250° F.

In the detailed description of the invention given above, frequent reference is made to combustible gases and their oxidation or combustion by gases supporting their combustion. Whenever the term combustible gases and like terms are used in the specification and the appended claims, we wish the same to be understood as including combustible vapors, such as gas like vapors of gasoline, alcohols, ethers and other volatile organic combustible compounds and materials, in addition to those substances which are normally gaseous at ordinary temperatures.

Although the new apparatus for putting into operation warning and gas flow regulating means is illustrated largely by reference to gas flow shut-off means, it is to be understood that this is only one variation of the invention which, in its broader sense, embodies the putting into operation of a source of power in response to predetermined temperature changes at a temperature responsive stage of the method, whether the source of power is used to operate known warning devices such as bells, whistles, visual signals, etc., or to operate known gas flow shut-off mechanisms such as valves, pinch cocks and clamps, etc., or both.

From the above description, it will be evident to those skilled in the art that numerous variations of the apparatus for gas flow control and/or warning are possible within the broad scope of the invention. An important combination is that whereby a source of power is released at a thermoresponsive stage, whether the power is to be utilized for warning purposes or for merely regulating or shutting off gas flow. Thus, the invention includes broadly an apparatus for gas flow regulation or warning which operates to pass a current of gas which may contain a combustible mixture of gases through a flash-back arresting zone, capable of removing heat from an ignited mixture of gases with sufficient rapidity to quench combustion of the same, into and through an enclosed ignition zone containing a normally functioning source of heat which first normally brings said current to a temperature at least great enough to burn any combustible mixture contained therein and then, by virtue of the flow of said current of gas, normally maintains the temperature at a selected thermoresponsive point located in the path of the flow beyond the heat source at a substantially constant value, but said temperature at said point fluctuating away from its normal constant value by at least predetermined safe minimum increases and decreases of temperature caused respectively by presence of combustible mixtures in the original current and by failure of the normally functioning source of heat to keep the temperature at the selected thermoresponsive point at its normal constant value, causing heat energy changes corresponding to said fluctuations of temperature to operate temperature responsive power releasing means located at said point and utilizing the power released to operate gas flow control and/or warning means.

As above described the apparatus is essentially a means for detecting danger or possible danger in connection with a gas distributing system, which detecting means may be utilized either for operating an alarm or for cutting off the gas supply thereby automatically preventing danger. The dangers which can be detected are, first, the presence of an inflammable mixture of gas and air in some selected space such, for instance, as a room in which a gas burner is located; second, a drop in pressure of gas in the supply line which might result in the extinguishing of a gas burner with subsequent leakage of gas therefrom; third, any inoperativeness of the detecting means is detected. Thus aside from whether the apparatus is used as an alarm or for cutting off the gas supply, it will always indicate danger or possible danger.

What we claim is:

1. Means for detecting danger of the presence within a selected space of an inflammable mixture of air and gas escaping from a supply; comprising a nozzle connected with the combustible gas supply and normally emitting a continuously flowing jet of gas therefrom, an ejector operated by the velocity of said jet, a conduit connected to said ejector through which a sample stream of atmosphere is withdrawn by said ejector from said selected space, a flashback arresting means in said conduit, heating means beyond said flashback arresting means for igniting said stream whenever ignitable or raising its temperature if nonignitable, a thermo responsive element located in heat transferring relation to a portion of said stream beyond said heating means, and a danger detecting element operated by a predetermined response of said thermo responsive element.

2. The construction as in claim 1 in which the thermo responsive element is normally held in neutral position, and is operated to actuate said danger detecting element alternatively by an increase or decrease of temperature transmitted thereto.

3. The construction as in claim 2 in which the danger detecting element is actuated by a predetermined decrease of pressure of the gas at the source.

4. The construction as in claim 2 in which the danger detecting element is actuated by a predetermined drop in temperature of the heating and igniting means.

5. The construction as in claim 3 provided with a normally open shutoff valve for the gas supply, and means operated by the actuation of said danger detecting element for closing said shutoff valve.

6. The construction as in claim 3 provided with an alarm, and means operated by the actuation of the danger detecting element for operating said alarm.

GEORGE L. WEISSMAN.
HOWARD A. GRAFFIS.

REFERENCES CITED

The following references are of record in the file of this patent:

UNITED STATES PATENTS

| Number | Name | Date |
| --- | --- | --- |
| 1,644,123 | Griswold | Oct. 4, 1927 |
| 1,681,698 | Brooks | Aug. 21, 1928 |
| 2,062,605 | Peters | Dec. 1, 1936 |
| 2,149,441 | Jacobson | Mar. 7, 1939 |
| 2,219,391 | Jacobson | Oct. 29, 1940 |
| 2,355,090 | Love et al. | Aug. 8, 1944 |
| 2,373,326 | Miller | Apr. 10, 1945 |